(12) United States Patent
Fenney

(10) Patent No.: US 11,232,634 B2
(45) Date of Patent: *Jan. 25, 2022

(54) METHOD AND APPARATUS FOR RENDERING A COMPUTER GENERATED IMAGE

(71) Applicant: Imagination Technologies Limited, Kings Langley (GB)

(72) Inventor: Simon Fenney, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/934,206

(22) Filed: Jul. 21, 2020

(65) Prior Publication Data

US 2020/0357173 A1    Nov. 12, 2020

Related U.S. Application Data

(62) Division of application No. 16/230,359, filed on Dec. 21, 2018, now Pat. No. 10,726,622, which is a division of application No. 15/896,532, filed on Feb. 14, 2018, now Pat. No. 10,163,259, which is a division of application No. 13/720,318, filed on Dec. 19, 2012, now Pat. No. 9,959,669, which is a division of application No. 12/800,540, filed on May 17, 2010, now Pat. No. 8,654,146.

(51) Int. Cl.
*G06T 17/20* (2006.01)
*G06T 15/00* (2011.01)
*G06T 9/00* (2006.01)

(52) U.S. Cl.
CPC .............. *G06T 17/20* (2013.01); *G06T 9/00* (2013.01); *G06T 15/005* (2013.01)

(58) Field of Classification Search
CPC .......... G06T 17/20; G06T 9/00; G06T 15/005
See application file for complete search history.

(56) References Cited

U.S. PATENT DOCUMENTS 5,329,613 A   7/1994 Brase et al.
5,335,319 A   8/1994 Obata
(Continued)

OTHER PUBLICATIONS

Eberly, "Triangulation by Ear Clipping," Geometric Tools, LLC, Mar. 2008, pp. 1-13.
(Continued)

*Primary Examiner* — Yanna Wu
(74) *Attorney, Agent, or Firm* — Potomac Law Group, PLLC; Vincent M DeLuca

(57) ABSTRACT

A method and apparatus for rendering a computer-generated image using a stencil buffer is described. The method divides an arbitrary closed polygonal contour into first and higher level primitives, where first level primitives correspond to contiguous vertices in the arbitrary closed polygonal contour and higher level primitives correspond to the end vertices of consecutive primitives of the immediately preceding primitive level. The method reduces the level of overdraw when rendering the arbitrary polygonal contour using a stencil buffer compared to other image space methods. A method of producing the primitives in an interleaved order, with second and higher level primitives being produced before the final first level primitives of the contour, is described which improves cache hit rate by reusing more vertices between primitives as they are produced.

19 Claims, 16 Drawing Sheets

(56) References Cited

U.S. PATENT DOCUMENTS

| | | |
|---|---|---|
| 6,285,375 B1 | 9/2001 | John, Jr. |
| 7,408,553 B1 | 8/2008 | Toksvig et al. |
| 7,982,735 B2 | 7/2011 | Lee et al. |
| 8,018,460 B2 | 9/2011 | Sugita |
| 8,072,452 B1 | 12/2011 | Brown |
| 2003/0058829 A1 | 3/2003 | Batra |
| 2006/0001555 A1 | 1/2006 | Partiwala et al. |

OTHER PUBLICATIONS

Lamot et al., "An Overview of Triangulation Algorithms for Simple Polygons," Information Visualization, 1999, pp. 153-158.

Sander et al., "Silhouette Clipping", Computer Graphics Proceedings, Annual Conference Series, 2000, SIGGRAPH 2000, Jul. 2000, pp. 327-334.

Shreiner et al., "Drawing Filled, Concave Polygons Using tile Stencil Buffer," OpenGL.RTM. Programming Guide, Fourth Edition, the Office Guide to Learning OpenGL.RTM., Version 1.4, Addison-Wesley, Nov. 2003, pp. 600-601.

"FIST: Fast Industrial-Strength Triangulation of Polygons", Held, Feb. 1, 2008, http://www.cosy.sbg.ac.at/.about.held/projects/triang/triang.html.

Fournier et al., "Triangulating Simple Polygons and Equivalent Problems," ACM Transactions on Graphics, vol. 3, No. 2, Apr. 1984, pp. 153-174.

PRIOR ART

Step size = 1

Step size = 4

Step size = 16

Step size = 64

Step size = 256

Step size = 512

(A)

300 StepSize=1 triangles filled (B)

310 Area remaining after StepSize=1 triangles processed (A)

350
StepSize=1 triangles filled

370
Area remaining after StepSize=1 triangles processed (B)

METHOD AND APPARATUS FOR RENDERING A COMPUTER GENERATED IMAGE

This is a divisional of prior U.S. application Ser. No. 12/800,540, filed May 17, 2010.

FIELD OF INVENTION

The invention relates to a method and apparatus for rendering computer generated images, in which the images include at least one closed polygonal contour. Particularly, the invention relates to rendering of images using image space calculations and standard graphics hardware and in which the polygons in the images include 'arbitrary' shaped polygons, where 'arbitrary' permits the existence concavities, self-intersections, and even multiple 'contours'.

BACKGROUND OF THE INVENTION

In a computer-generated image, there are typically a large number of individual polygons. Graphics rendering hardware, in particular 3D graphics hardware, often only has capability for the rendering of triangle primitives or, occasionally, other convex polygons, that is to say, polygons in which all the internal angles of the polygon are less than 180°. Such polygons are relatively straightforward to render. Such specifications include 'fill rules' which determine which parts of an arbitrary polygon are to be deemed interior and which are exterior. SVG defines two such rules—'even-odd' and "non-zero". For brevity in this document, we will usually assume use of the 'even-odd' rule but it will be clear to one skilled in the art that the techniques presented apply to other well-defined fill rules.

FIGS. 1a to 1e show some examples of 'arbitrary' polygons (including concave polygons, polygons with self-intersections and multiple contour polygons). FIGS. 1a and 1e each show an example of a concave polygon, that is to say, a polygon in which at least one of the internal angles is greater than 180°. FIG. 1b shows an example of a polygon with self intersections, that is to say, a polygon in which not every part of each line segment between two vertices remains inside or on the boundary of the polygon. FIG. 1c shows an example of a polygon with multiple contours, that is to say, a polygon with a hole requiring an external and an internal contour to define the overall shape. FIG. 1d shows an example of a polygon including all these features.

The ability to render such arbitrary polygons, whilst also supporting convex polygons, is useful for a number of reasons, for example, to support vector graphics standards such as SVG (Scalable Vector Graphics) and OpenVG (Open Vector Graphics). SVG is a language for describing two-dimensional graphics and graphical applications in XML (Extensible Markup Language). OpenVG is a royalty-free, application programming interface (API) designed for hardware-accelerated 2-dimensional vector graphics. Naturally, any method able to render the arbitrary polygons, must also be able to handle convex polygons.

There are two families of methods with the capability of rendering arbitrary polygons on such hardware. The first family performs calculations in model space and are generally referred to as triangulation algorithms. These take a polygon outline and produce a set of non-overlapping triangles that exactly cover the filled area of the original polygon. To avoid confusion with other uses of "triangulation" in this document, we will refer to such algorithms as "true triangulation". An example of the possible results of such a process, as applied to the polygon of FIG. 1a is shown in FIG. 2. The original shape can thus be constructed from the triangles: {[v2,v3,v5], [v3,v4,v5], [v5,v6,v2], [v6,v2,v7], [v7,v2,v1]}. Assuming a simple polygon with N-sides and that no extra vertices are added (note some algorithms do introduce additional vertices), we will obtain N−2 triangles. Once these triangles are generated, they can easily be rendered on any commodity graphics hardware.

Numerous algorithms for the "true triangulation" process have been published. Lamot and Zalik provide a survey of methods in "*An overview of triangulation algorithms for simple polygons*" (Information Visualization, 1999, pp 153-158). These documented methods are nearly always restricted to simple polygons such as FIGS. 1(a) and (e), i.e., they may contain neither self-intersections (including repeated vertices) nor multiple contours. Nevertheless, Meister's "ear cutting" (or ear clipping) algorithm and Seidel's method are of interest to this discussion.

Meister's method removes one vertex at a time from a (simple) polygon in such a way that the reduced polygon remains simple. It repeatedly 'clips an ear', formed by a triple of consecutive vertices, from the polygon. This algorithm runs in $O(n^3)$ time and, although it has been subsequently improved to be $O(n^2)$, it is not particularly attractive except for polygons with relatively few vertices.

Seidel's method, on the other hand, runs in O(n log*n) time for simple polygons where log*(n) is defined as . . .

$$\log*n = \begin{cases} 0 & \text{if } n \le 1 \\ 1 + \log*(\log n) & \text{if } n > 1 \end{cases}$$

We can thus consider O(n log*n) to be practically $O(n)$ for any reasonable values of n.

As stated above, very few 'true triangulation' algorithms have been published that handle arbitrary polygons. Held's method ("FIST: Fast Industrial-Strength Triangulation of Polygons" Algorithmica 30, 4, 563-596) is one of the few exceptions. Although based on ear clipping, additional structures are used to achieve a much better time complexity for simple polygons, but it is not clear to the inventor how it behaves in the presence of self-intersections etc.

The application's inventor has implemented a version of Seidel's algorithm that has been enhanced to support completely arbitrary polygons. This still achieves virtually linear performance (assuming the implicit vertices created by self-intersections are included in 'n'). However, on a ~2 GHz CPU, the process still takes an average of 1~2 μs per polygon vertex. For polygons that will be drawn multiple times over numerous frames, the triangulation results can be cached, and so the pre-processing cost is amortised by the rendering process. For situations, however, where a polygon is only drawn a few times or is being dynamically altered on a frame-by-frame basis—which forces re-triangulation—the true triangulation process can be a very significant penalty. (Note that applying linear transformations to the model does not require re-triangulation.)

The second family of methods with the capability of rendering arbitrary polygons uses image space calculations. Here the rendering/sampling process itself is adapted to determine which pixels fall inside the arbitrary polygon and which are outside. Although this can be done with scan line rendering algorithms, we are primarily interested in those that break the arbitrary polygon into smaller polygons (usually triangles) for which the hardware has direct rendering support, render those smaller polygons and make use of the hardware stencil buffer to determine which of the rendered pixels are inside the original arbitrary polygon. It is well known in the art ("*OpenGL programming guide: the official guide to learning OpenGL, version* 1.4", Shreiner et al, ISBN 0321173481) that arbitrary polygons can drawn by using the stencil buffer. For example, one may implement the odd-even rule by applying XOR operations to the stencil. Similarly, provided triangle winding orders are taken into account, increments and decrements of the stencil can be used to implement the non-zero rule.

With either fill rule, one must first produce a set of triangles from the source polygon. The obvious approach is described in the "Drawing Filled, Concave Polygons Using the Stencil Buffer" section of chapter 13 of Shreiner et al (available at either http://fly.cc.fer.hr/~unreal/theredbook/chapter13.html or http://www.scribd.com/doc/7605395/Redbook). Here a triangle fan (refer Chapter 2 of Shreiner et al or http://en.wikipedia.org/wiki/Triangle fan) is created by simply submitting the vertices in order, i.e. [$v_1$, $v_2$, $v_3$, ... $v_N$] which implicitly creates the set of N−2 triangles with vertices' {[$v_1,v_2,v_3$], [$v_1,v_3,v_4$], [$v_1$, $v_4$, $v_5$] . . . [$v_1,v_{N-1},v_N$]}.

Borrowing the example (FIG. 1 (*a*)) from Shreiner et al, part of this process is shown in FIG. 3. The seven sided figure is rendered as a fan of five triangles. Assuming the odd-even fill rule, the pixels of the screen which are covered by an odd number of triangles will be deemed interior while those covered by an even number will be exterior. For example, the area bounded by v1, v3, and location 20, is covered by triangles [$v_1,v_2,v_3$] and [$v_1,v_3,v_4$]. Assuming that the stencil buffer is initialised to zero and an XOR operation employed, drawing triangle [$v_1,v_2,v_3$] will first set all the pixels' stencil values for region [$v_1,v_3$,"20"] but these will subsequently be cleared again by triangle[$v_1,v_3,v_4$]. The region will thus be correctly deemed exterior to the polygon. The simplicity of this process is extremely appealing and, since it uses a triangle fan, it only requires the transmission of N vertices to the graphics hardware.

Once the stencil has been set to indicate which pixels are inside the polygon, it must be filled with the appropriate colours or textures. Methods to do this include computing the 2D bounding rectangle of all the vertices of the polygon and then drawing just a single rectangle (with stencil test), or to simply resend the generated triangles. The former, as applied to FIG. 1(*a*) and illustrated in FIG. 15(*a*), has the advantage of sending a near minimal amount of geometric data to the hardware but requires pre-computation of min and max bounds. It also can be expensive, in terms of wasted pixel processing, if the rectangle does not tightly bound the polygon to be filled, as shown by the region 415.

Another method, as shown in FIG. 15(*b*), —in this example using a set of triangles generated using the invention's method (refer FIG. 7)—sends more geometry than the bounding box method but generally results in less redundant pixel filling. In this example, much of the shape is filled with a single 'layer/pass' of pixels, 450, but there are regions where pixels are filled multiple times, 460. This typically becomes worse with polygons with greater numbers of regions of, or total area of, concavity.

The method also works unaltered for self-intersecting and multiple contour polygons—Shreiner et al also provide an example of the latter. In effect they just concatenate all the vertices of all the contours and treat the result as larger triangle fan.

Despite the pleasing simplicity of this fan method, as described in the art, the inventor has appreciated that it has two fundamental problems. The first is related to the shape of the generated triangles. Producing a fan of triangles from the original polygon tends to lead to the production of long, thin triangles. Such a triangle is generally slower to render with graphics hardware than another that has an equal screen area but is 'more equilateral' in shape. One publication, "Silhouette clipping", (Sander et al, SIGGRAPH 2000, pages 327-334) discusses this problem and gives a partial solution. Sander et al also need to fill sets of contour edges. These are, in effect, polygons and are likely to have concavities. They state:

"The basic algorithm described so far tends to draw many long, thin triangles. On many rasterizing chips (e.g. NVIDIA's TNT2), there is a large penalty for rendering such eccentric triangles. It is easy to show that the setStencil algorithm behaves best when the screen-space projection of q has a y coordinate at the median of the contour vertices. Choosing q as the 3D centroid of the contour vertices serves as a fast approximation".

. . . and . . . .

"Each edge contour is drawn as a fan of triangles about an arbitrary center point, which we choose to be the 3D centroid of the contour vertices."

This typically does improve the shape of the triangles but unfortunately introduces an extra point, which thus requires the data to be read twice. It also creates an additional triangle in the fan. An example of the results of their process, as applied to FIG. 1 (*a*), is shown in FIG. 4. (Please note that the 'centroid' location, Vcentroid, is only an approximation in this illustration).

Sander et al suggest a further improvement:

"To further reduce the eccentricity of the fan triangles, we break up each large contour into a set of smaller loops. More precisely, we pick two vertices on the contour, add to the data structure two opposing directed edges between these vertices, and proceed as before on the smaller loops thus formed."

This is, unfortunately, quite vague. Firstly, they don't say how "we pick two vertices". Secondly, in the context of the paper, "proceed as before on the smaller loops" would appear to imply the process of computing the 'centroid' of each loop and turning each into a fan. That does not seem correct as it would only produce two child loops.

A more likely interpretation is that they have a target, M, for the number of vertices per child 'loop' and divide the source polygon into sufficient equal pieces to meet that target number. An N-vertex source polygon would thus require P child polygons where P=⌊N/(M−1)⌋ With their scheme, if the source polygon is thus divided into P sections, then P additional vertices (each located at the centroid of its respective 'loop') are introduced. It should be noted that, since each child loop is drawn with a fan, there are practical reasons—described in the following paragraph—for not choosing too small a value for M.

Also of relevance to the invention are the methods by which contemporary rendering hardware reduces the triangle data and bus bandwidth when models are supplied to the rendering hardware. The simplest method is to supply each triangle as three, V-byte vertices so that, for a model with T triangles, 3*T*V bytes of data would be transmitted to the hardware, but more efficient options exist. We have already seen that 3D hardware typically supports the concept of triangle fans, whereby a T triangle fan only needs to supply (T+2)*V bytes of data. For 3D models, a related concept called triangle strips (again see Shreiner or http://en.wikipedia.org/wiki/Triangle strip), is typically more useful. Like triangle fans, these also require only (T+2)*V bytes of data for a strip of T triangles. In both cases, the ratio of triangles to vertices climbs asymptotically towards 1:1 as the length of the strip or fan increases. Longer strips and fans are thus more efficient.

Over the past decade, an indexed triangle format has been seeing increased popularity as a means of further decreasing the bandwidth and storage costs. Here each triangle is defined as three integer indices, each say of 16 or 32 bits, which select vertices from a vertex array. With 3D models, this format offers the opportunity to exceed the 1:1 barrier of strips and fans, though this is unlikely for 2D shapes. To efficiently support such a format, graphics hardware now frequently employs a vertex caching technique such as that described by Hoppe ("*Optimization of mesh locality for transparent vertex caching*", Computer Graphics (SIGGRAPH '99 Proceedings) pp 269-276). In brief, the hardware maintains a cache of the last K vertices used in past triangles. A FIFO replacement policy is generally employed rather than, say, a Least Recently Used (LRU) scheme as the former is not only simpler but, more importantly, generally results in a higher cache hit rate for 3D models.

We now return to the second, and probably far more significant problem with the prior art fan algorithm, which is that it can require a disproportionate amount of "pixel filling". For example, one can see from FIG. 3 that there is a relatively large area which is covered by multiple triangles compared to the ideal situation of FIG. 2 as generated by a 'real triangulation' method. We will refer to the areas covered by multiple triangles as 'overdraw'. This overdraw is an undesirable burden in the rendering phase and it is advantageous to reduce it if possible.

On average, simply using the less-obvious triangle strip order i.e. outputting the vertices in the order $v_1$, $v_2$, $v_N$, $v_3$, $v_{N-1}$, $v_4$ . . . and thus producing the triangles $\{[v_1,v_2,v_N]$, $[v_2,v_N,v_3]$, $[v_N,v_3,v_{N-1}]$ . . . $\}$ often results in both better shaped triangles and lower overdraw compared to fan order (although, ironically, not in the particular case FIG. 1 (*a*)), but the improvement is unfortunately not that great. From FIG. 4, Sander et al's method would also appear to reduce overdraw at the expense of introducing an additional vertex and triangle, but it certainly does not work in all cases. Applying their method to FIG. 1 (*e*), where the centroid would be located in the centre of the "U", would result in significant regions of overdraw, as shown in FIG. 5.

The inventor has appreciated that there is a need for a method of producing a set of simpler polygons (usually, but not always, triangles) from an arbitrary polygon for rendering with a stencil buffer method which:

Avoids pre-processing of the polygon data—(if the preprocessing becomes expensive one might as well use a true triangulation algorithm.)

Does not introduce additional vertices.

On average, produces lower overdraw rates than the fan (or strip) methods.

On average, produces 'more equilateral' shaped triangles than the fan/strip methods.

Is simple to implement in both software and hardware and uses relatively few operations. It must, of course, be O(n).

It is an object of the present invention to provide a method and system that goes some way towards achieving the above goals.

In addition, for any method and system, the following features, though not necessarily essential, are desired:

Geometry data transfer costs that are approximately equivalent with the fan/strip methods.

The supplied primitives, e.g. triangles, should, preferably, be arranged in an order so that "chronologically close"

primitives are also close in screen space so that caching (e.g. frame buffer caching) can be more effective.

A method should not be substantially more complex than the fan method.

SUMMARY OF THE INVENTION

The invention is defined in the appended claims to which reference should now be made. Advantageous features are defined in the dependent claims.

In order to address the issues identified with known methods, the inventor has appreciated the following:

A vertex on a polygon more typically forms a convex, rather than concave, angle.

The support of indexed triangles in rendering hardware may allow alternative triangle orders to be supported efficiently.

Vertices with numerically local indices tend to also be spatially local. This is typically more apparent with polygons with larger numbers of vertices such as those illustrated in FIGS. 6*a*, 6*b*, and 6*c*.

Graphics rendering hardware nearly always provides 'free' support for determining if a polygon is clockwise or anticlockwise and can be instructed to cull out polygons with a particular winding order.

In the "ear clipping algorithms" (e.g. Meister or Held) for true triangulation, a 'safe' vertex is identified and then removed to reduce an N sided shape to an N−1 shape. The clipped vertex then forms a triangle with its two original neighbours. Unfortunately, the identification of a 'safe' vertex, i.e. where the produced triangle is entirely inside the original polygon is expensive.

We have appreciated that if one is using an image space method and rendering using a stencil buffer, then it not absolutely critical if the vertex selected is 'safe'. Taking the example from FIG. 3, one can consider that the fan method, in effect, progressively clips the ears formed by vertices $V_2$, $V_3$ . . . $V_5$ until the polygon is reduced to the triangle $\{V_1,V_6,V_7\}$.

For triangle primitives, the inventor has appreciated that if a simple ear clipping algorithm is applied to every second vertex of an original (single) contour of an N-sided polygon, the $\lfloor N/2 \rfloor$ triangles thus formed will typically be more equilateral in shape than those produced by the fan or strip method. Furthermore, these triangles are less likely to have large regions that either lie outside of the final filled shape or overlap other triangles, than those typically generated by the fan or strip methods. After this process, one will be left with a 'residual' polygon with $\lceil N/2 \rceil$ (ie ceiling(N/2)) vertices. The same process may then be reapplied to produce another set of triangles and another residual polygon with even fewer vertices. This process is thus repeated until the residual polygon is 'empty' i.e. when the residual polygon is a primitive of the size desired for output or the residual polygon has trivially zero area. The results of such a process as applied to FIG. 1 (*a*) are shown in FIG. 7. In this example, the desired result of lower overdraw has been achieved.

The preceding paragraph assumes that the rendering system supports triangle primitives. Some rendering systems also support the rendering of quads (either convex or arbitrary) or even M-sided 'arbitrary' polygons with say, M≤16. Although the preferred embodiments detailed below demonstrate the invention for triangle primitives, the invention is not restricted to the output of triangle primitives and may output M-sided primitive units, or output primitive units of more than one type, eg triangles and quads, if used with more flexible rendering systems. In the presently preferred embodiments, one type of primitive, e.g. triangles, will be outputted to cover the majority of the contour.

It is also highly desirable to make the colour or texture filling process that occurs once the stencil has been set up, be as efficient as reasonably possible. To this end, the inventor has also appreciated that a single contour arbitrary polygon, without self-intersections, will have an overall winding order and, furthermore, it is usually advantageous for this winding order to be consistent for all objects drawn by an application. (This is due to the 'triangle fill' or 'tie-breaking rules' of graphics hardware as, say, summarised by the OpenGL, DirectX, or OpenVG standards, to avoid artefacts such as 'gaps' appearing between abutting objects). For practical systems, a multiple contour arbitrary polygon will thus also use a consistent overall winding order for the other pieces. (By consistent, it should be noted that contours representing 'holes' will have the opposite winding order and that each contour will not, in itself, be self-intersecting.)

The inventor has noted that, once the stencil buffer has been set up, for such an arbitrary polygon that has an overall winding order, W, only those triangles that were used to create the stencil that also have winding order W will be needed when filling the object. This can be demonstrated by considering the behaviour of the non-zero fill rule as the pixels drawn are a superset of those produced by the odd-even rule.

Assuming the overall winding order W corresponds to an increment of a pixel's stencil value, we thus will only need to fill those pixels whose stencil has a positive value. Triangles with the opposite winding order only subtract from the stencil's value and, since we are assuming a consistent winding order, can be eliminated. Since rendering pipelines typically provide free support for eliminating polygons with a user selectable winding order, the original triangulation can be re-used. (Note that polygons such as a self-intersecting 'bow-tie'. i.e. "[0,0], [1,0], [0,1], [1,1]" do not have an overall winding order and so cannot use this additional optimisation).

This process, as applied to the triangulation of FIG. 1 (a) as illustrated in FIG. 7, is shown in FIG. 16, and can be compared with the results shown in FIG. 15(b). One can see that the triangle, 520, can be eliminated from the fill process, leaving, in this case, just regions with a single layer of fill, 510. There is still some redundant filling, but this is greatly reduced compared to 460.

BRIEF DESCRIPTION OF THE DRAWINGS

Exemplary embodiments of the invention will now be described in detail with reference to the accompanying drawings, in which.

DETAILED DESCRIPTION OF A PREFERRED EMBODIMENT

Figure 1A:
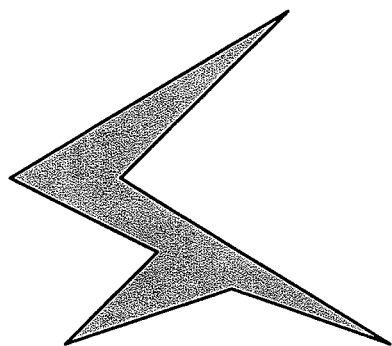
FIGS. 1A, 1B, 1C, 1D and 1E show five examples of 'arbitrary' polygons.
Figure 1B:
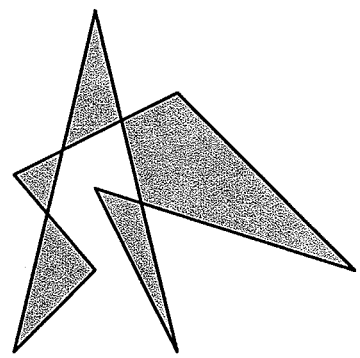
Figure 1C:
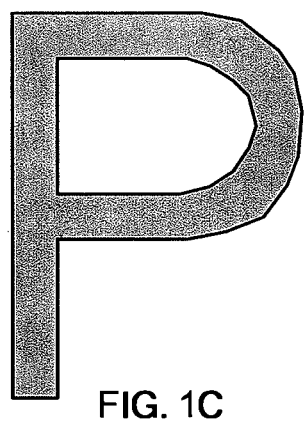
Figure 1D:
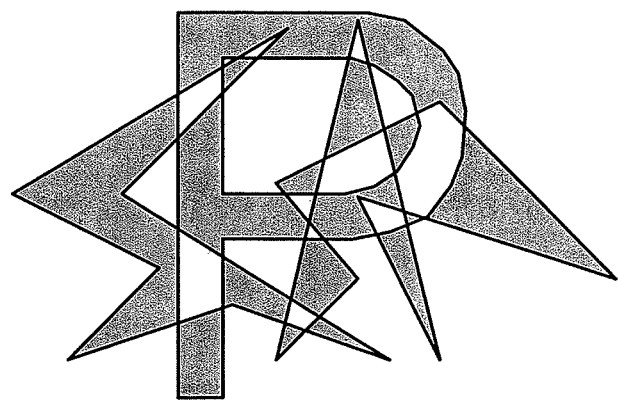
Figure 1E:
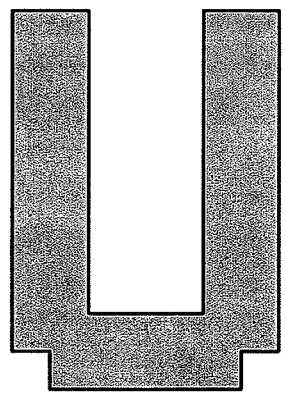
Figure 2:
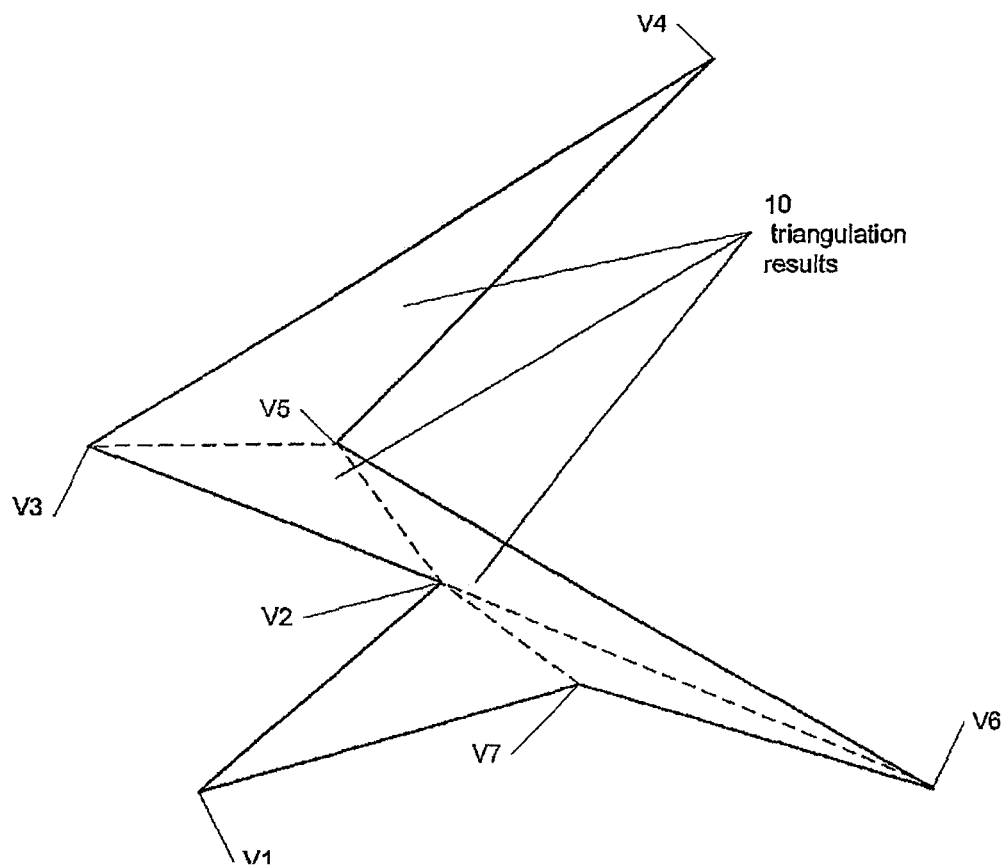
FIG. 2 shows the possible results of applying a 'true triangulation' process to the polygon of FIG. 1A.
Figure 3:
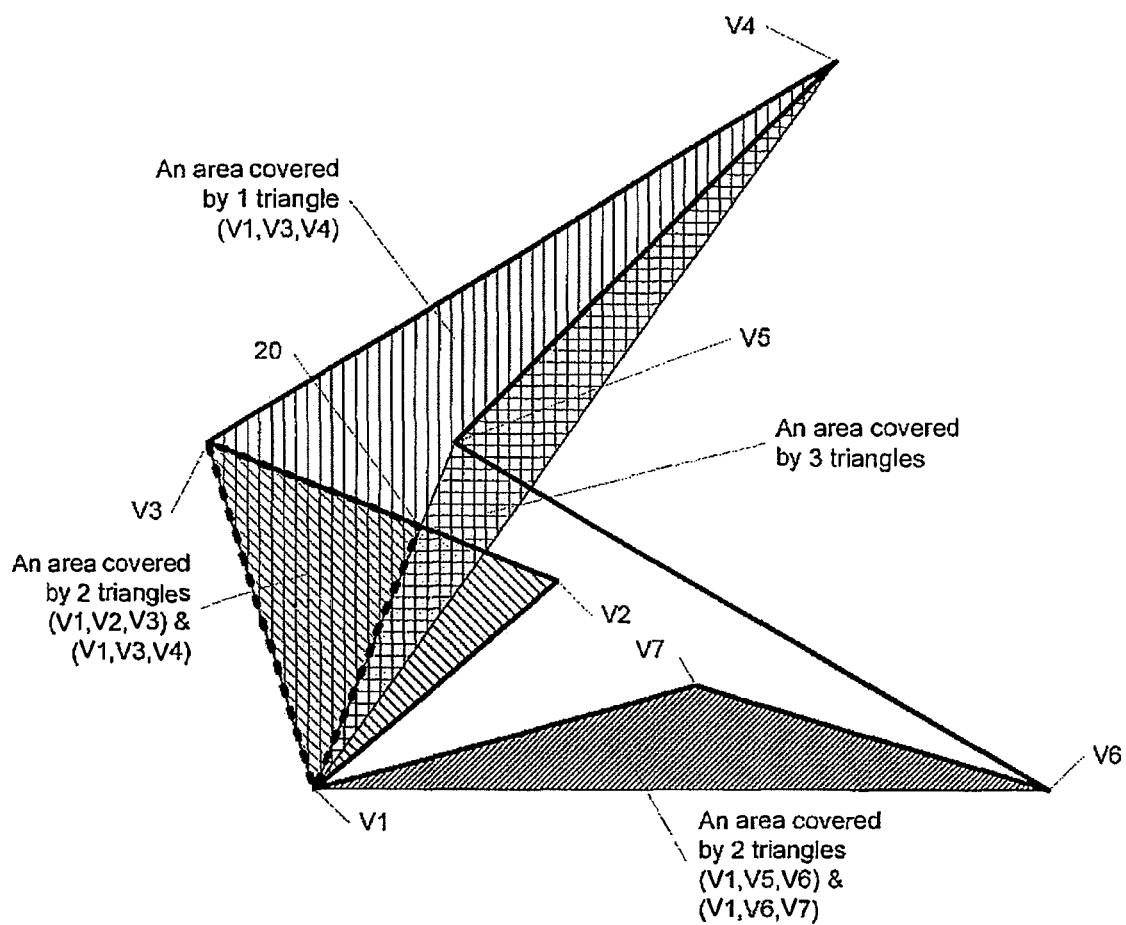
FIG. 3 shows triangles generated by the most well known, prior art process for rendering in conjunction with a stencil buffer as applied to the polygon of FIG. 1A.
Figure 4:
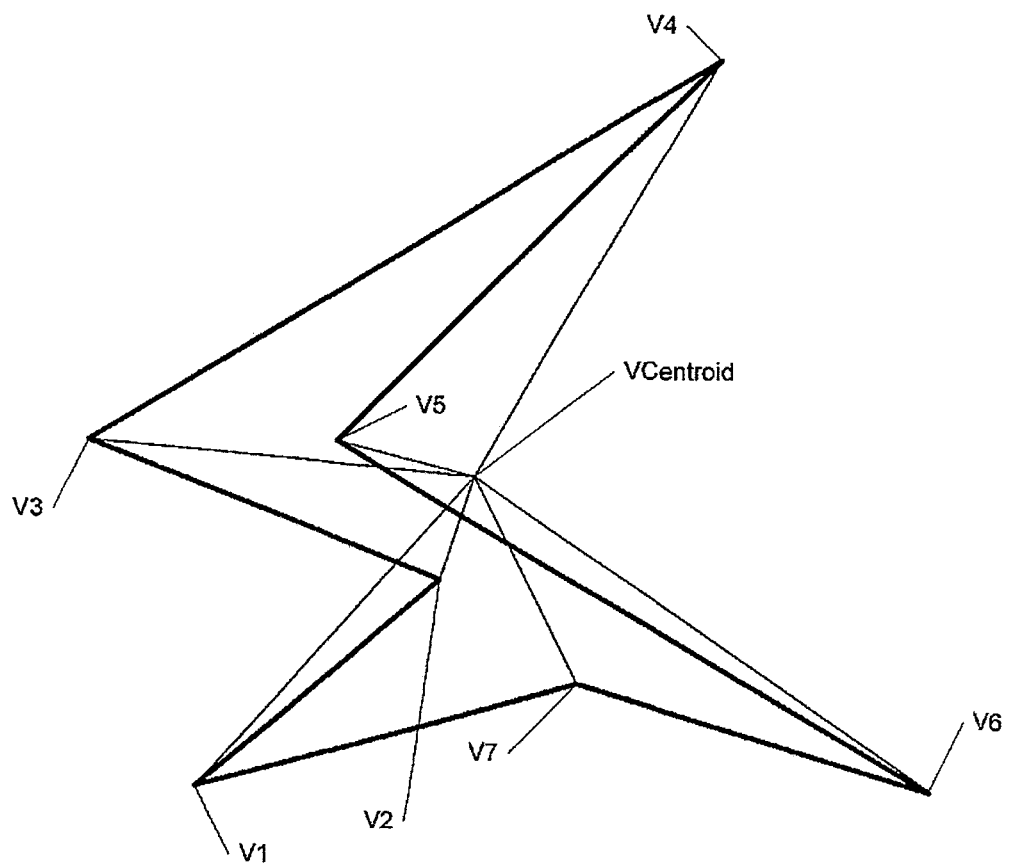
FIG. 4 shows an additional point and triangles generated using Sander et al's method as applied to the polygon of FIG. 1A.
Figure 5:
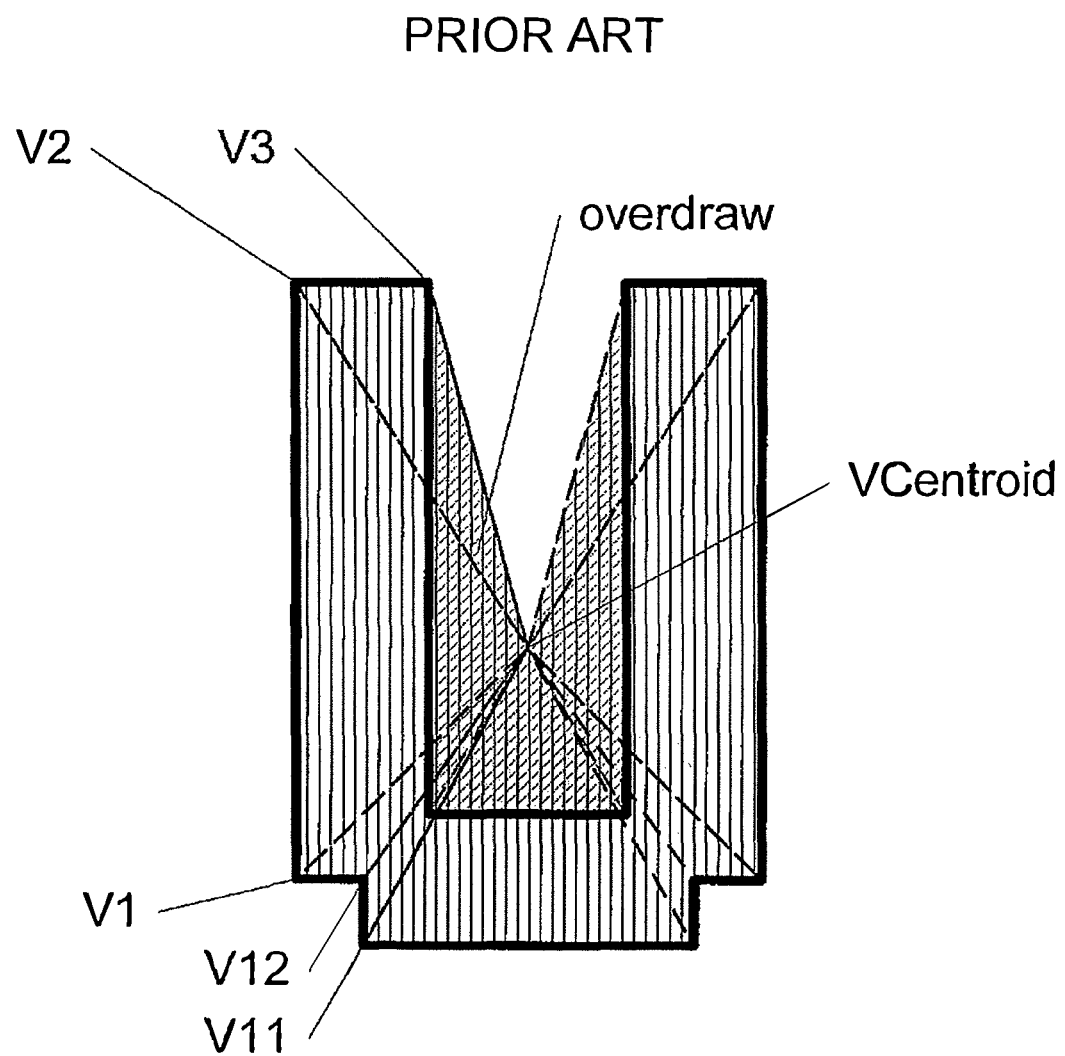
FIG. 5 shows Sander et al's method as applied to the polygon of FIG. 1E.
Figure 6A:
FIGS. 6A, 6B, 6C, 6D and 6E show five examples of 'arbitrary' polygons with more significant numbers of vertices.
Figure 6B:
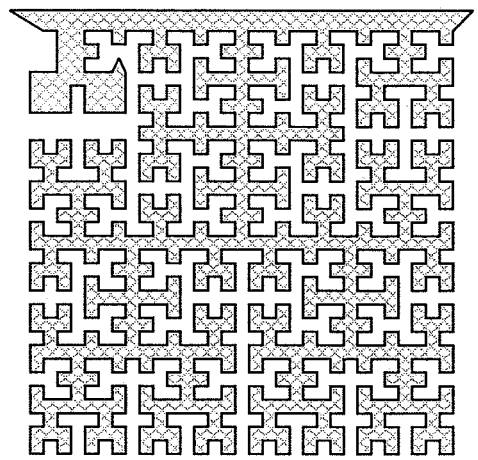
Figure 6C:
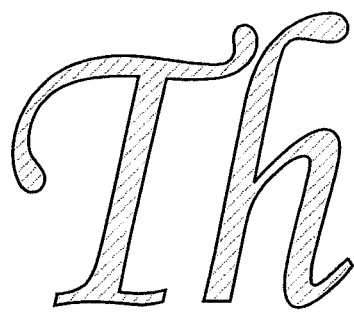
Figure 6D:
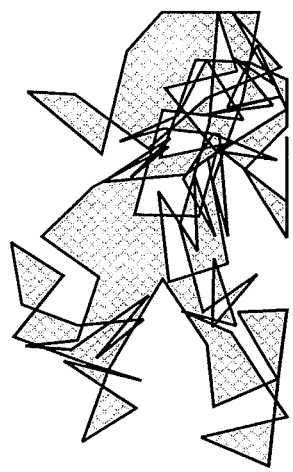
Figure 6E:
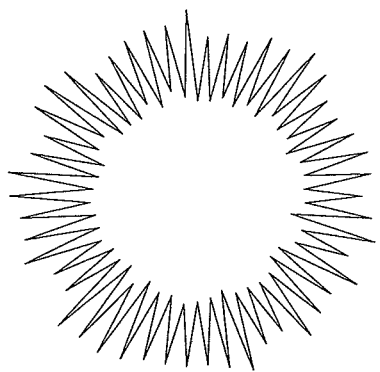
Figure 7:
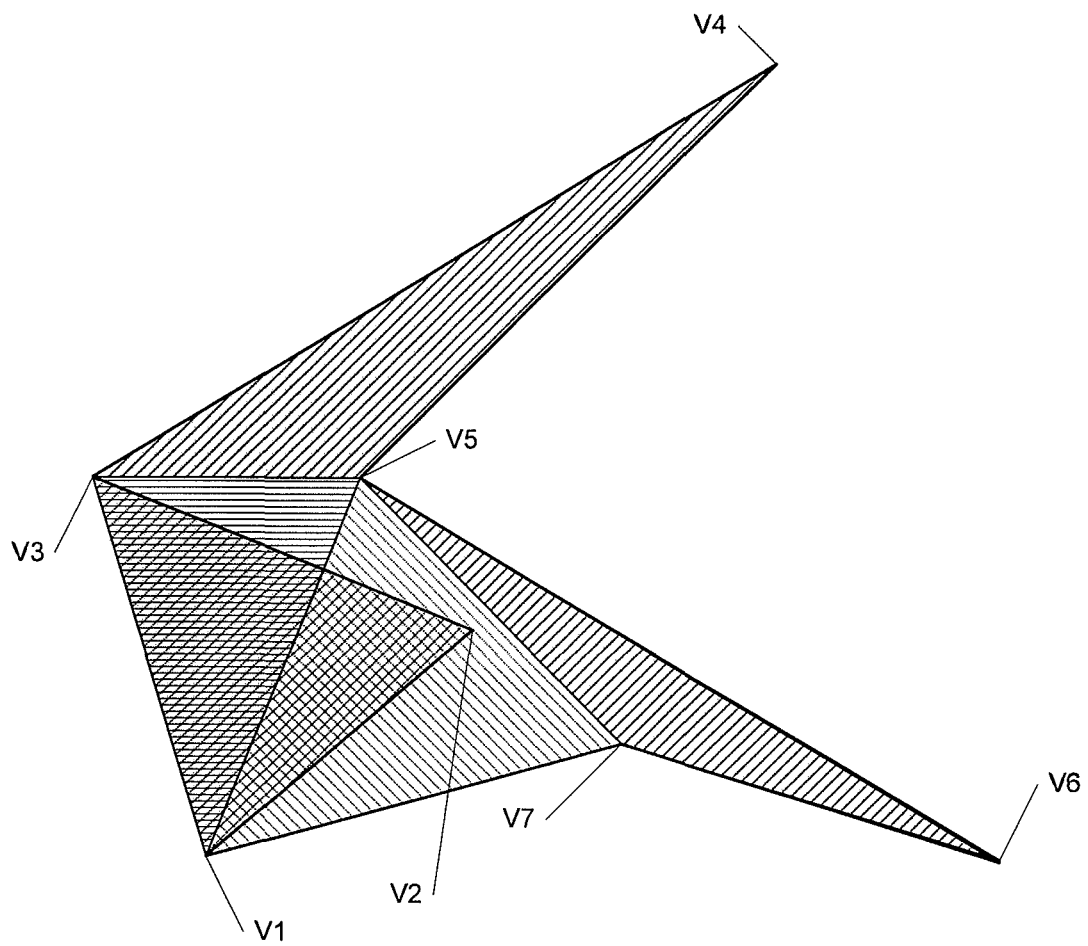
FIG. 7 shows the triangles generated by one embodiment of the present invention as applied to the polygon of FIG. 1A.
Figure 8:
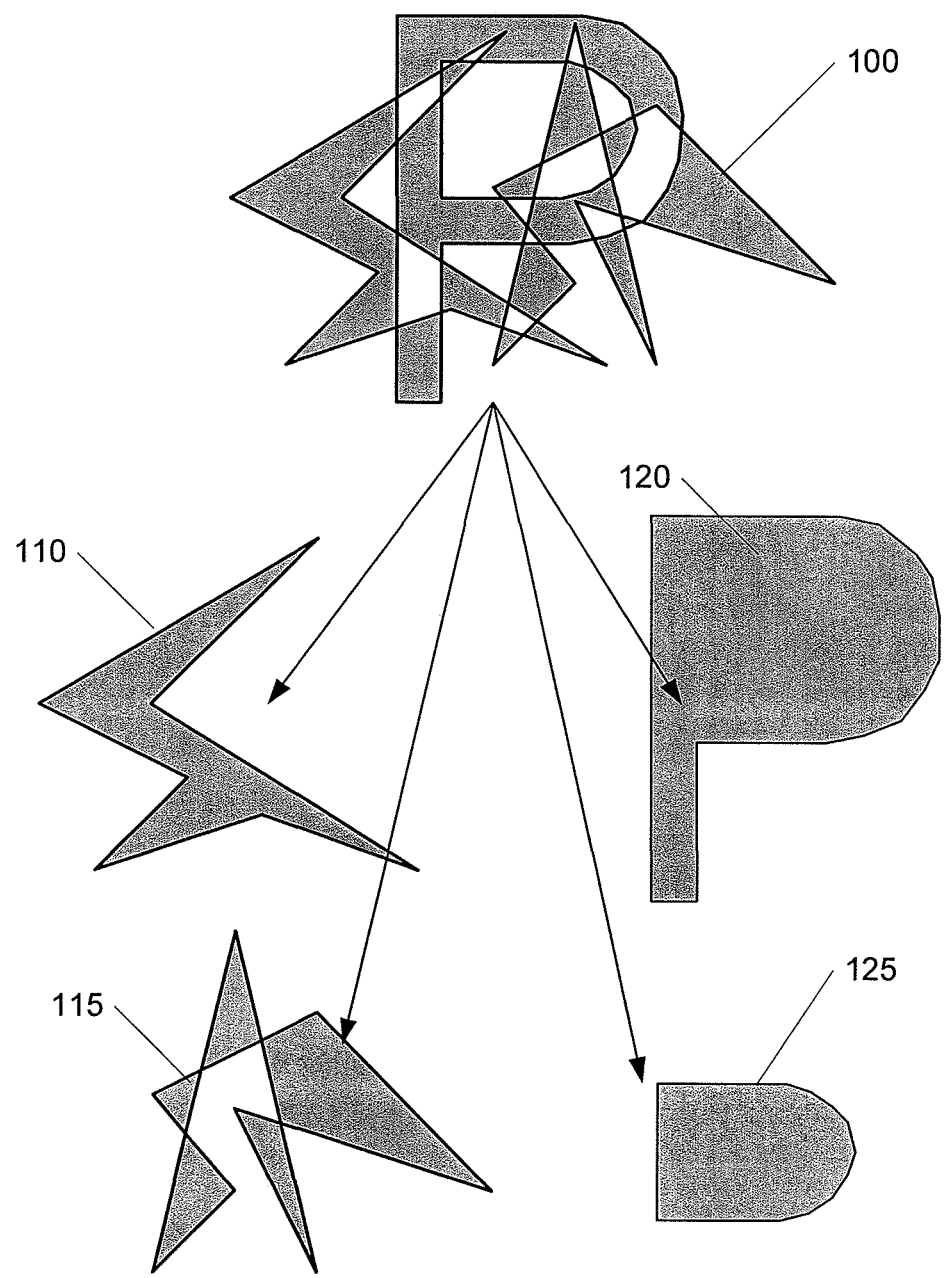
FIG. 8 shows the first step of processing of an embodiment of the invention, in which a multi-contoured arbitrary polygon is logically split into its contours.
Figure 9A:
FIGS. 9A, 9B, 9C, 9D, 9E and 9F each show a subset of the triangles, each set corresponding to a certain hierarchical "size" of triangle, as generated by an embodiment of the invention as applied to the polygon of FIG. 6A.
Figure 9B:
Figure 9C:
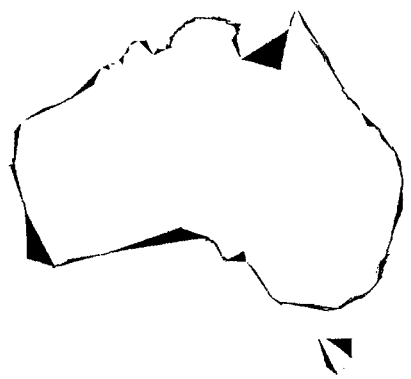
Figure 9D:
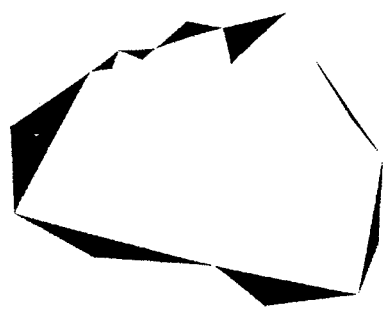
Figure 9E:
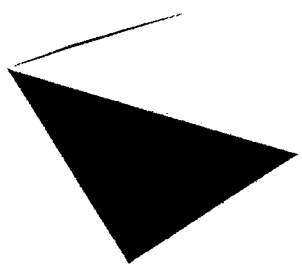
Figure 9F:
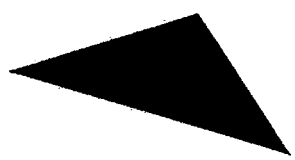

A first preferred embodiment is essentially that described earlier which is represented by the steps:

1. An arbitrary polygon is first logically separated into its constituent closed contours or sub-paths. FIG. 8 shows this simple process applied to the example polygon of FIG. 1(d). Clearly, for a single contour polygons such as those of FIGS. 1(a), (b) and (e), this is step can be ignored.

Note that this differs from Shreiner et al where the contours are all concatenated and treated as a single fan. Although simple, it usually leads to significantly greater overdraw.

2. A contour is converted to a set of primitives, in this case triangles, with the method described below, and the resulting primitives e.g. triangles are concatenated with those sets generated by any earlier contours of the polygon.

3. The combined sets of primitives e.g. triangles are rendered using the stencil buffer.

The conversion of a contour, $C^0 = (v_0^0, v_1^0, v_2^0, \ldots v_{N^0-1}^0)$, where $N^0 \geq 3$, to a set of primitives, consists of dividing the closed polygonal contour into smaller polygonal units of maximum size P, P≥3, vertices by repeatedly removing (up to) a first set of P−2 vertices from the contour, to produce a polygon with P vertices, $(v_0^0, v_1^0 \ldots v_{P-1}^0)$, and a reduced source contour with $N^0-(P-2)$ vertices, removing (if possible) a second set of (up to) P−2 vertices starting with the last vertex of previous set and continuing thus until the end of the source contour. More precisely, this produces an initial set of smaller polygons, $$\{(v_0^0, v_1^0 \ldots v_{P-1}^0), (v_{P-1}^0, v_P^0 \ldots v_{2P-2}^0) \ldots$$
$$(v_{i \cdot (P-1)}^0, v_{i \cdot (P-1)}^0 \ldots v_{N^0-1}^0)\}$$

... and a residual contour ...

$$C^1 = (V_0^0, v_{P-1}^0, v_{2 \cdot (P-1)}^0, \ldots v_{N^0-1}^0)$$

... which, for convenience of expression, can be renumbered as ...

$$C^1 = (v_0^1, v_1^1, \ldots v_{N^1-1}^1) \text{ where } N^{i+1} = \left\lfloor \frac{N^i}{P} \right\rfloor$$

This process is repeated with each subsequently reduced contour, $C^j$, until it has either P or fewer vertices, or been reduced to a line segment (and thus trivially zero area). The generated primitives are then rendered using a stencil buffer to produce a computer-generated image.

For example, the process of step 2 applied to a single contour, to generate triangles (ie for P=3), in accordance with a first embodiment of the invention will now be described. It is assumed that the contour has N-sides with vertices numbered from Base to Base+N−1:

```
StepSize := 1;
WHILE( StepSize < N )
{
    // generate all the triangles with this step size
    J := 0;
    WHILE (J < (N - StepSize))
    {
        // Get the other two points that will make
        // up this triangle
        PtB := MIN(J+      StepSize, N-1);
        PtC := MIN(J + 2*StepSize, N-1);
        //if this is a non degenerate triangle...
        IF(PtB != PtC)
        {
            //output triangle {J, PtB, PtC} relative
            //to "base"
            OutputTriangle(J + Base,
                PtB + Base,
                PtC + Base);
        }
        // Move to the next triangle in this set
        J := J + 2*StepSize;
    }
    // Double the step size
    StepSize := StepSize * 2;
}
```

It should be appreciated that this simple algorithm can be realised in hardware by one skilled in the art using a language such as VHDL or Verilog and would require only a small number of components including adders, registers, and comparators.

Figure 10:
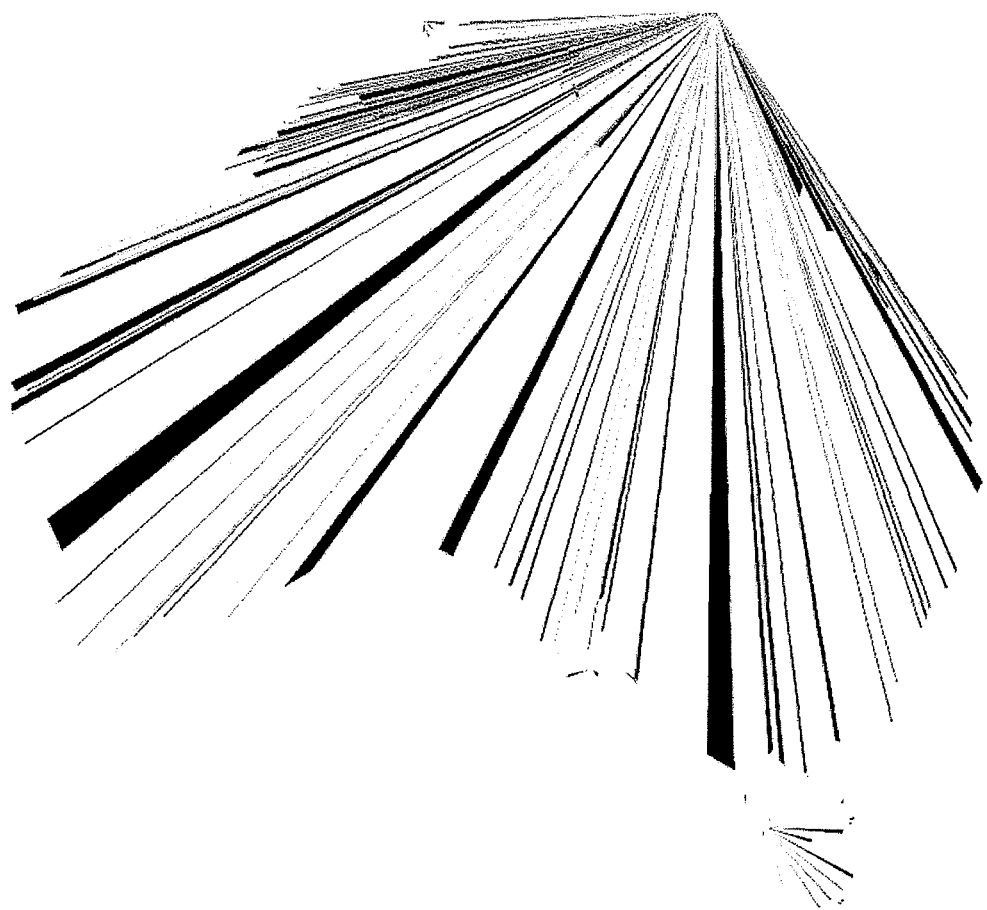
FIG. 10 shows a subset (every $10^{th}$ triangle) of the output of a modified fan method applied to the polygon of FIG. 6A.

FIG. 6 shows five examples of arbitrary polygons with more significant numbers of vertices. The map of Australia in FIG. 6*a* contains approximately 1500 vertices with 26 contours. The 'Hilbert curve' shown in FIG. 6*b* contains 1000 vertices. The "Th" text in FIG. 6*c* has 807 vertices, while both the random walk, shown in FIG. 6*d*, and star, shown in FIG. 6*e*, both have 100 source vertices. Any of these arbitrary polygons may be rendered using the invention. For example, FIG. 9 shows certain subsets of the output triangles of the method, as applied to the polygon of FIG. 6*a*, wherein the six images show the results of capturing and rendering the triangle output when StepSize is 1, 4, 16, 64, 256, and 512 respectively. For comparison purposes, FIG. 10 shows every $10^{th}$ triangle generated by a modified prior-art fan algorithm (the modification being to treat each contour separately rather than the less efficient merging as suggested by Shreiner et al). Comparing FIG. 9 and FIG. 10 one can see that triangles thus produced by the invention are, for this source model, significantly better shaped than those generated by the fan algorithm.

Figure 11A:
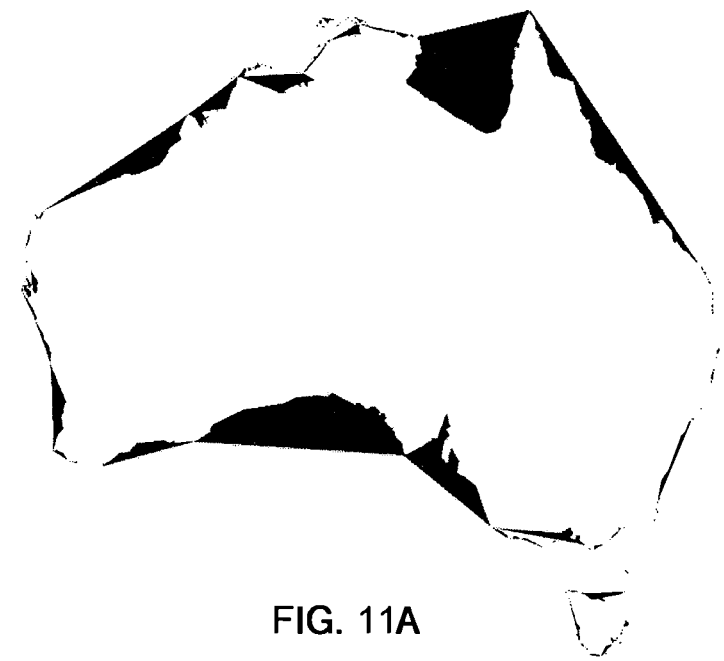
FIGS. 11A and 11B illustrate areas of overdraw that occur with the triangles generated by an embodiment of the invention, FIG. 11A as applied to the polygon of FIG. 6A, and FIG. 11B the overdraw caused by a modified fan algorithm.
Figure 11B:
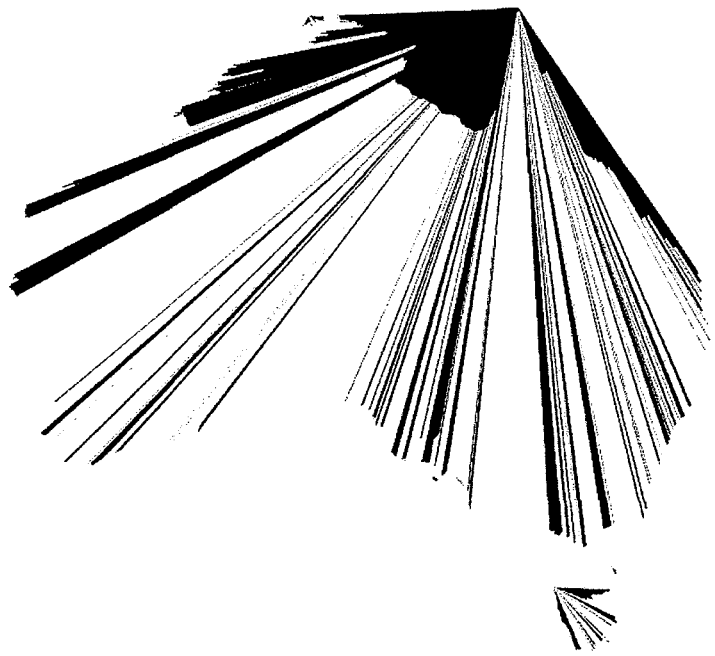

Of more importance is the amount of overdraw produced by the invention. FIG. 11 (A) shows the pixels that are covered by more than one triangle. For simplicity, this figure does not distinguish between areas covered by two triangles and those covered by three or more triangles even though the latter clearly is increasingly costly. Nevertheless, if we just count the number of pixels touched by the overdraw region relative to the pixels of the final intended result, we find that overdraw has an area that is approximately 15% of the area of the intended final result.

By contrast, FIG. 11 (B) shows the overdraw area using the modified fan algorithm. In this situation, the overdrawn pixels represent a region that, surprisingly, has an area that is approximately 39% of the final result. Note that the unmodified Shreiner fan algorithm would be significantly worse.

This first embodiment of the invention described above does, on average, address the two most important issues, i.e. that of improved triangle shape and reduced overdraw. Though of less importance, the first embodiment does not achieve the triangle data efficiency of fans and strips, whereby an N-sided contour, requiring N−2 triangles, can be transmitted with just N vertices. Another potential drawback of the method of the first embodiment is that, with the possible exception of the final larger values of StepSize, generated triangles that are 'chronologically' local, are often only spatially local in the vicinity of a single shared vertex.

If one examines the order of vertices created by the previously described embodiment, (and assuming the vertices start from "1") one can see that the triangles are created in the order $\{[v_1,v_2,V_3], [v_3,v_4,v_5], [v_5,v_6,v_7] \ldots [v_1,v_3,v_5], [v_5,v_7,v_9] \ldots \}$. If we assume this data is provided in an indexed format to hardware with a K-vertex cache (where K is typically much smaller than N), it will only achieve a cache hit rate of around 33% since only one vertex is usually reused between adjacent triangles. A fan or strip, on the other hand, achieves nearly 66% as two vertices are shared.

A second preferred embodiment will now be presented that addresses these additional issues. This second embodiment incorporates the additional feature of a very small stack. Assuming the maximum number of vertices in a contour that will ever be encountered is $N_{Max}$, then this stack needs at most $\lceil \log_2(N_{Max}) \rceil + 1$ (ie ceiling ($\log_2 (N_{max})$)+1) entries. For example, if in a given system a contour could have at most $2^{16}$ vertices, then the stack would have no more than 17 entries.

This embodiment provides interleaving of primitive levels to maximise vertex temporal locality and produces at least one second level primitive before all the first level primitives are produced. Primitive polygon level is reflected in the separation of the vertices of the primitive polygon relative to the vertices of the original arbitrary closed polygonal contour. A first level primitive has vertices which are contiguous vertices in the original closed polygonal contour. Higher level primitives have vertices which are offset from each other in the original closed polygonal contour. The amount of offset is related to the primitive level and the number of vertices in the primitive. An $(i+1)^{th}$ level (i≥1) primitive is formed of end points of consecutive $i^{th}$ level primitives. Considering the set of $i^{th}$ level primitives, and associated vertices, each vertex will belong to exactly one member of the set except for the special case of end points, an end point being shared with at most one other $i^{th}$ level primitive.

When a contour is divided into a single size of primitive over all primitive levels, for primitive level i and polygon primitive size Q, the vertices in the $i^{th}$ level primitive correspond to vertices offset from each other by $(Q-1)^{\wedge}(i-1)$ in the original arbitrary closed polygonal contour. For example, when dividing a contour using only triangle primitives, assuming first level primitives have vertices [v1, v2, v3], [v3, v4, v5] . . . , the second level primitives will have vertices [v1, v3, v5], [v5,v7,v9] . . . with an offset of $(3-1)^{\wedge}(2-1)=2$ relative to the vertices of the original closed polygonal contour, and the third level primitives will have vertices [v1, v5,v9], [v9,v13, v17] . . . with an offset of 4 relative to the vertices of the original closed polygonal contour etc.

The second embodiment uses the same steps 1 and 3 as the first variant, but replaces step 2, i.e. the triangulation of a single contour, with the following method, as expressed in pseudo code. We will assume, as before, that the contour starts at vertex number 'base' and has N vertices.

```
int Vstack[MAX_VERTEX_STACK_SIZE]; //vertex stack
int StackDepth;
int CurrentVertexID;
// put the first vertex, 0, on the stack.
StackDepth := 1;
Vstack[0] := 0;
CurrentVertexID := 1; //next vertex to process*/
// while we have at least 2 more vertices
WHILE(CurrentVertexID <= N-2)
{
    // put the next two vertices on the stack
    Vstack[StackDepth]   := CurrentVertexID;
    Vstack[StackDepth+1] := CurrentVertexID+1;
    CurrentVertexID+=2;
    StackDepth +=2;
    // form a triangle from the top 3 vertices
    OutputTriangle(Vstack[StackDepth-3] + Base,
            Vstack[StackDepth-2] + Base,
            Vstack[StackDepth-1] + Base);
    // remove the 'second from top' stack element
    Vstack[StackDepth-2] := Vstack[StackDepth-1];
    StackDepth--;
    //do all the higher triangle levels we can..
    WHILE((StackDepth >= 3) &&
        ((Vstack[StackDepth-1] - Vstack[StackDepth-2]) ==
            (Vstack[StackDepth-2] - Vstack[StackDepth-3])) )
    {
        // form a triangle from the top 3 vertices
        OutputTriangle(Vstack[StackDepth-3] + Base,
                Vstack[StackDepth-2] + Base,
                Vstack[StackDepth-1] + Base);
        // remove the second from top stack element
        Vstack[StackDepth-2] := Vstack[StackDepth-1];
        StackDepth--;
    }//end while doing upper levels
}//end while at least 2 vertices left
// process remaining whole triangles on the stack
WHILE(StackDepth >= 3)
{
    // form a triangle from the top 3 vertices
    OutputTriangle(Vstack[StackDepth-3] + Base,
            Vstack[StackDepth-2] + Base,
            Vstack[StackDepth-1] + Base);
    // remove the second from top stack element
    Vstack[StackDepth-2] := Vstack[StackDepth-1];
    StackDepth--;
}//end while
// if there is just one vertex left to do,
// add it to the stack and form the final triangle
IF(CurrentVertexID <= N-1)
{
    Vstack[StackDepth] := CurrentVertexID;
    StackDepth++;
    // form a triangle from the top 3 vertices
    OutputTriangle(Vstack[StackDepth-3] + Base,
            Vstack[StackDepth-2] + Base,
            Vstack[StackDepth-1] + Base);
}// end if one leftover vertex
```

In this embodiment, the triangles are produced in an order which is far more 'vertex cache friendly'. Specifically, the triangles produced are . . .

$$\{[v_1,v_2,v_3],[v_3,v_4,v_5],[v_1,v_3,V_5],[v_5,v_6,v_7],[v_7,v_8,v_9],[v_5,v_7,v_9],[v_1,v_5,v_9] \ldots \}.$$

In essence, triangles corresponding to various values of "StepSize" of the first embodiment are interleaved. Assuming N is sufficiently large, triangles are produced corresponding to the following levels, at least initially, with the pattern . . .

StepSize=[1,1,2,1,1,2,4,1,1,2,1,1,2,4,8,1 . . . ]

With the ordering produced by the second embodiment and, assuming the existence of a 16-entry vertex cache with a FIFO replacement policy, the hit rate for, say, a 120 vertex contour is a respectable 62% which is nearly double that of the first embodiment and on-par with a fan or strip.

Figure 12:
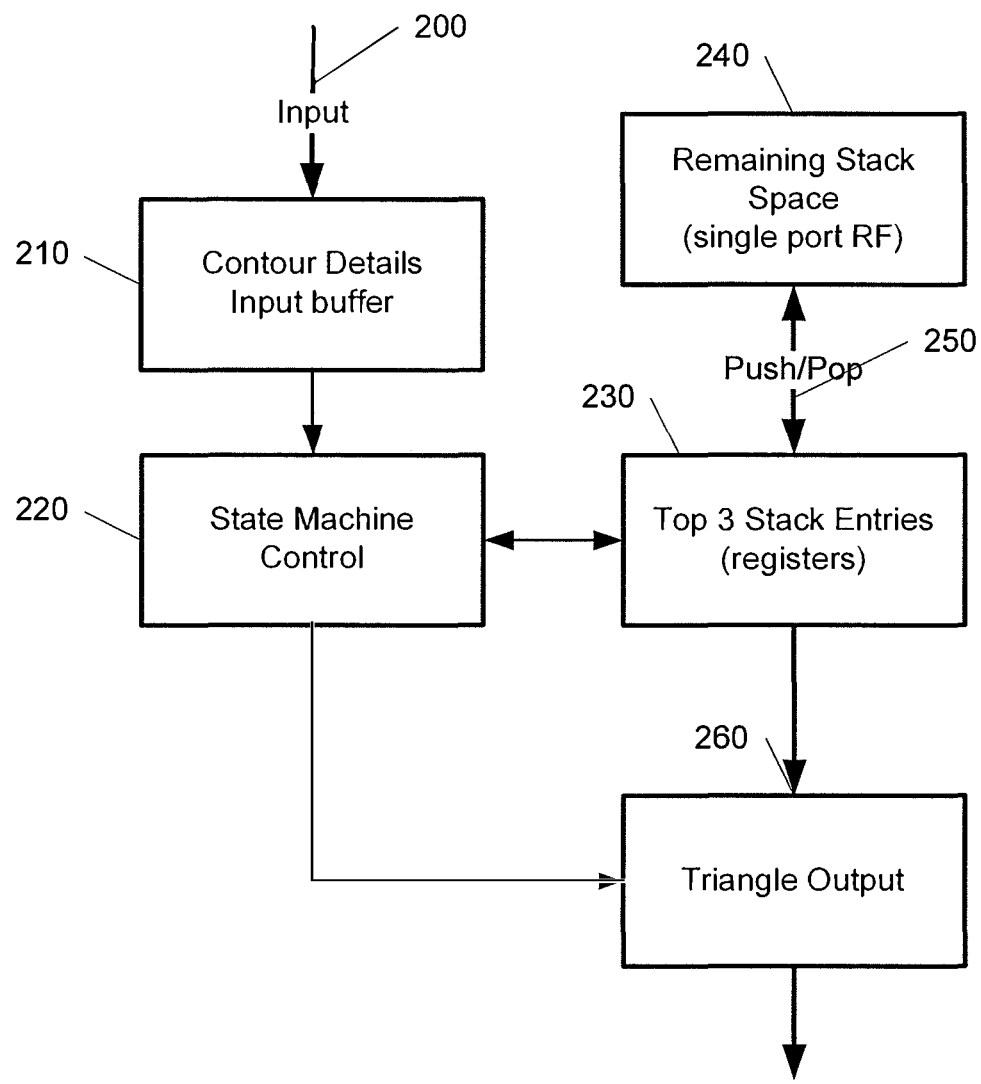
FIG. 12 shows an overview of an exemplary embodiment of the apparatus of the invention.

An example of an apparatus implementing the invention is shown in FIG. 12. The parameters for a contour are supplied, 200, to an input buffer, 210. These are read by a state machine, 220, which implements the steps described in the pseudo code above.

The state machine has access to a vertex stack. The vertex stack is preferably split into two portions, a first portion 230 containing P stack entries and a second portion 240. The state machine 220 has direct access to the top P entries (in the case of triangulation, P=3) of the first portion of the vertex stack 230. Because it is desirable to have parallel read and write access to these three entries, these would preferably be implemented as independent registers. The second portion of the vertex stack 240 holds the remaining stack entries and would only require a single read/write port, and so could be implemented with a cheaper register file with an index to the element that is $4^{th}$ highest on the stack.

There is a read/write path, 250, between the first portion of the vertex stack 230 containing in this case the top three entries, and the remainder of the stack space, second portion 240, to allow for pushing and popping of stack data.

Unit 230 also supports the ability to remove or overwrite central elements (when P=3, the second from top stack element, corresponding to the elements which will be culled or clipped as the contour is processed) as described in the pseudo code above. The stack operations are done under the guidance of the state machine. The primitive output unit, here a triangle output unit, 260, can be instructed by the state machine to select the top three stack elements, 230, and output the corresponding triangle.

Using a rendering simulator, the "cycle" counts for filling of the stencil for the arbitrary polygons of FIG. 6, using a number of the described triangle generation techniques are compared against each other. Also, as a target benchmark, the rendering cycles (not including pre-processing costs) of the results of a true triangulation algorithm are supplied. For ease of interpretation, the scores are normalised so that the (modified) fan algorithm scores 1.0. Smaller figures are better. The "Sander" algorithm is the inventor's interpretation of Sander et al's document.

| Model/method | Fan* | Strip | "Sander" | Invention | Adapted Seidels |
|---|---|---|---|---|---|
| Map (J) | 1.0 | 1.04 | 0.45 | 0.36 | 0.24 |
| Hilbert (K) | 1.0 | 0.55 | 0.36 | 0.32 | 0.06 |
| Text (L) | 1.0 | 0.71 | 0.84 | 0.83 | 0.20 |
| Rand Walk (M) | 1.0 | 0.97 | 0.62 | 0.68 | 0.10 |
| Star (N) | 1.0 | 1.21 | 0.77 | 0.53 | 0.18 |

As can be seen, then invention generally compares favourably against the other stencil-based methods.

The second preferred embodiment can further be adapted so that it is unnecessary to know, in advance, how many vertices are in a particular contour before starting to generate the triangle indices. Such an embodiment would be useful in an application which streams vertices that are generated 'on the fly'. Additionally, it can be modified to not require support for indexed triangles in the rendering hardware by also storing vertex coordinates in a wider stack.

Some rendering systems also support the rendering of quads (either convex or arbitrary) or even M-sided 'arbitrary' polygons with, say, M≤16. Either of the presented preferred embodiments can be easily adapted, without departing from the scope of the invention, to output primitive units other than triangles to suit these more flexible rendering systems.

Figure 13A:
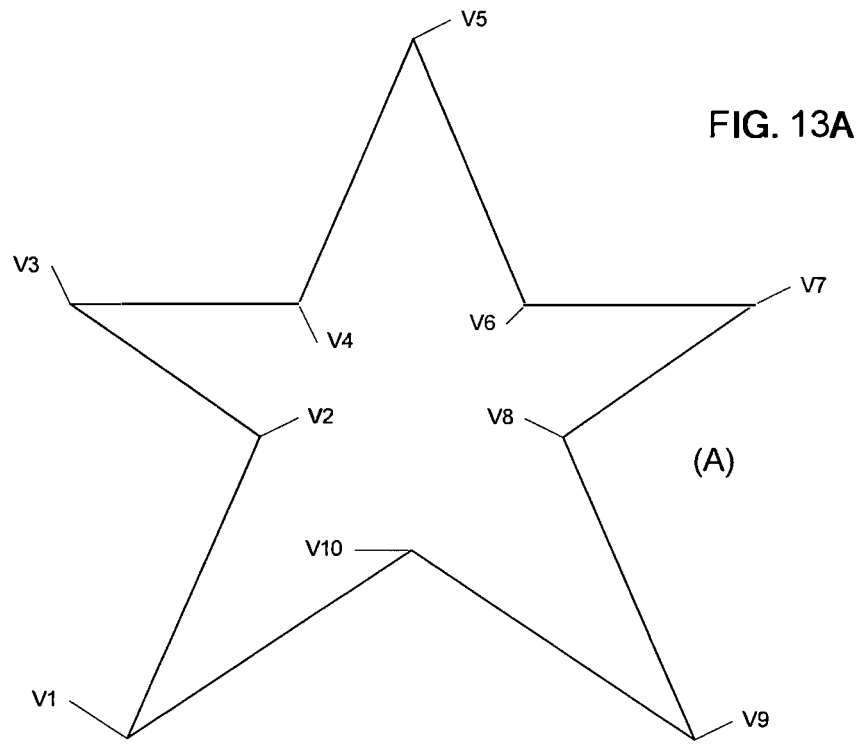
FIGS. 13A and 13B show a pathological polygon case for an embodiment of the invention.
Figure 13B:
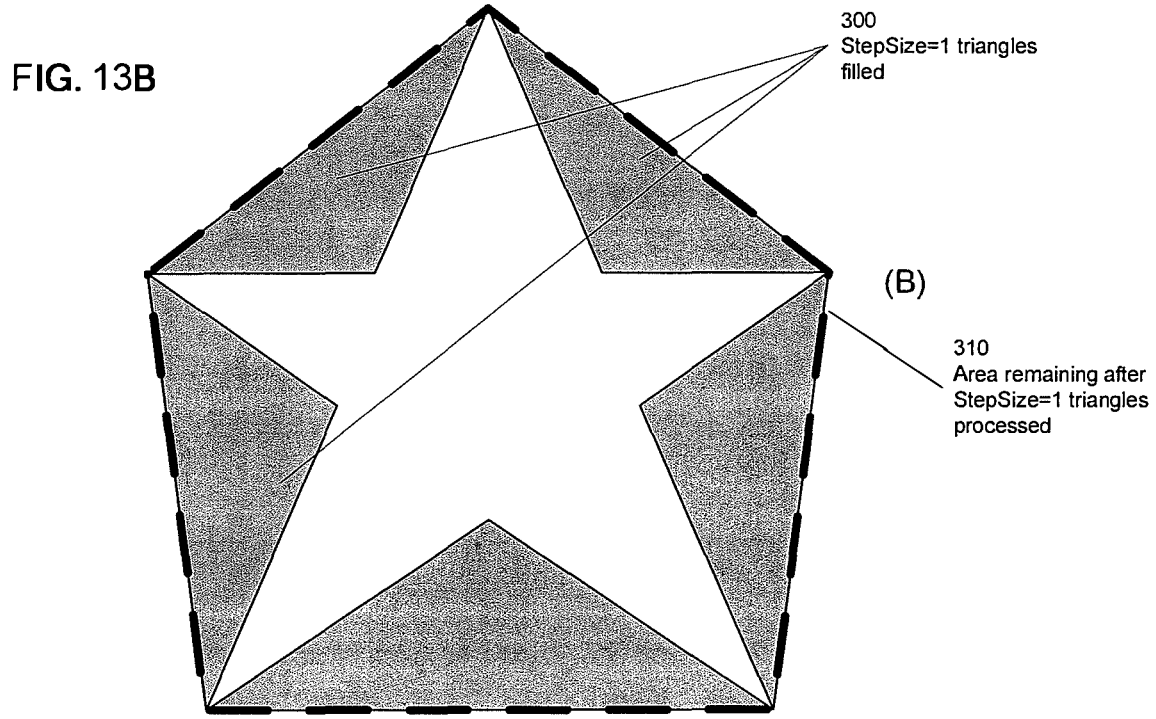

The invention thus presented, on average, reduces overdraw, improves the triangle shape and/or reduces the data required, relative to the prior art, but one can encounter pathological situations. A very simple case is shown in FIG. 13 (A). Here, the first three vertices, {v1, v2, v3}, form a concavity in the shape, as do all the other "StepSize=1" triangles, 300, as shown in grey in FIG. 13 (B). After their processing, the method effectively still has to fill the large pentagonal region, 310. As can be seen from the figure, all these triangles would form a considerable area of overdraw.

Figure 14A:
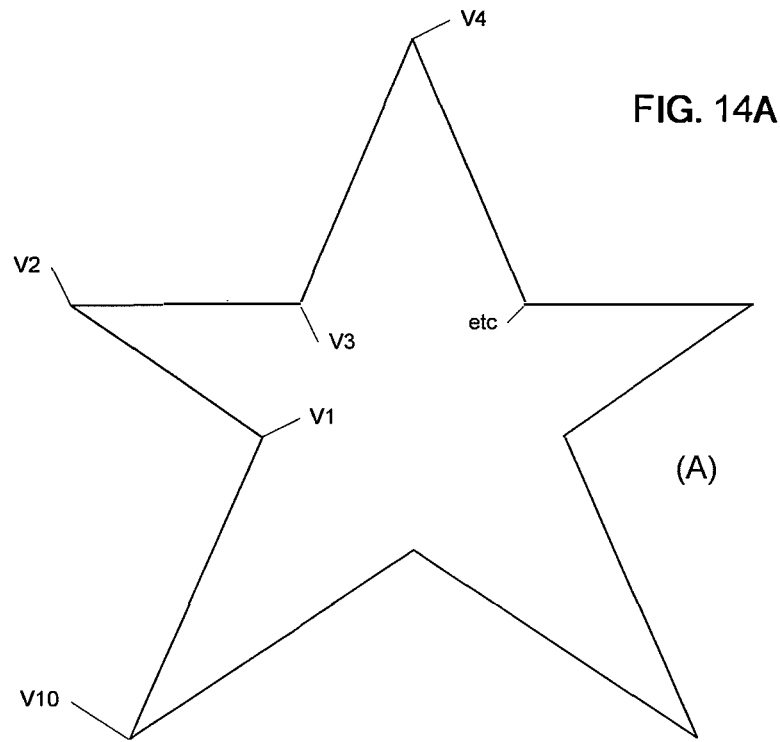
FIGS. 14A and 14B show an alternate configuration of the case of FIGS. 14A and 14B, that is not pathological.
Figure 14B:
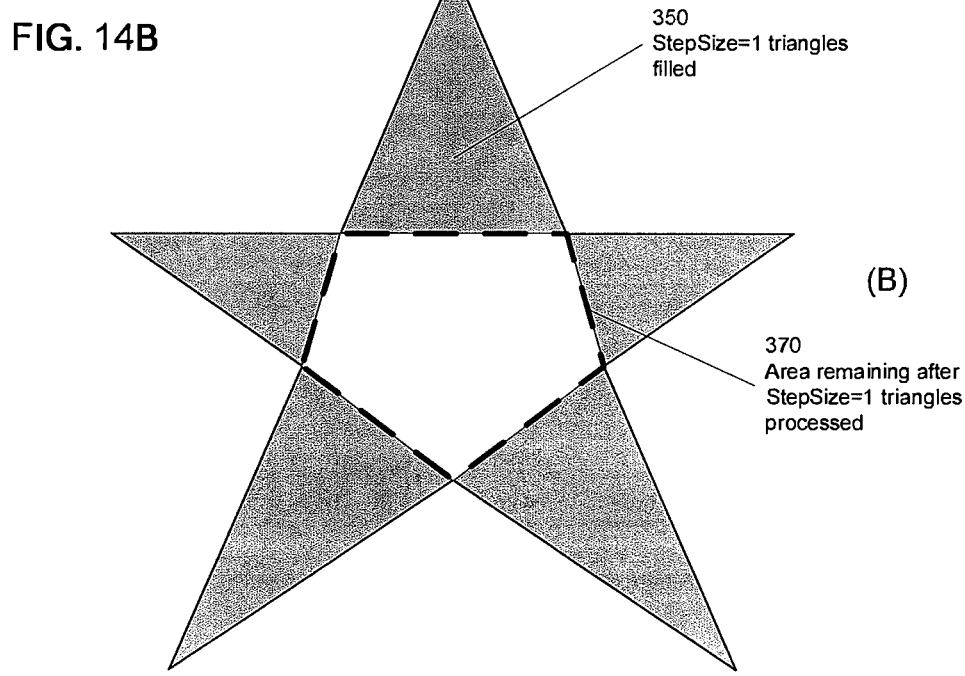
Figure 15A:
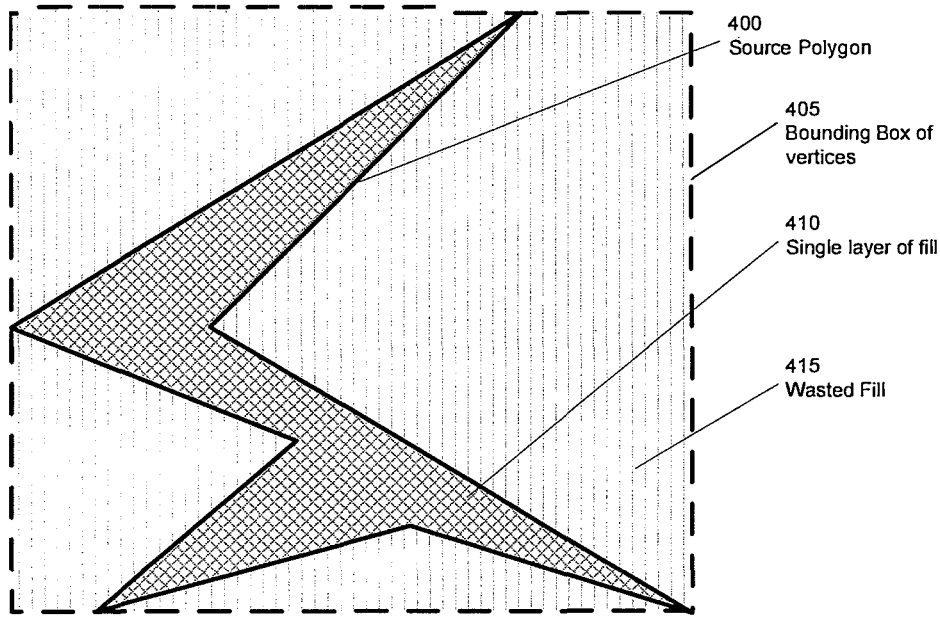
FIGS. 15A and 15B show two methods of filling the polygon's pixels once the stencil buffer values have been determined. Method (A) uses a rectangular bounding box determined from the extremities of the polygon while method (B) resends the triangulation used to create the stencil.
Figure 15B:
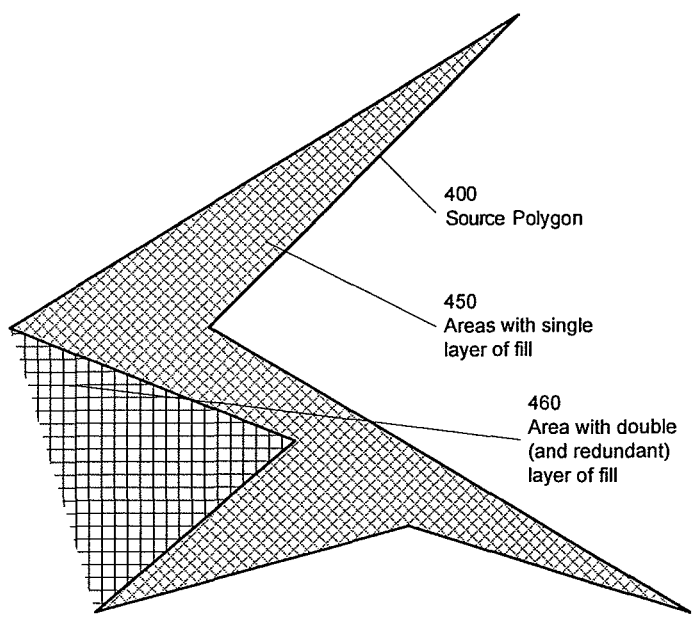
Figure 16:
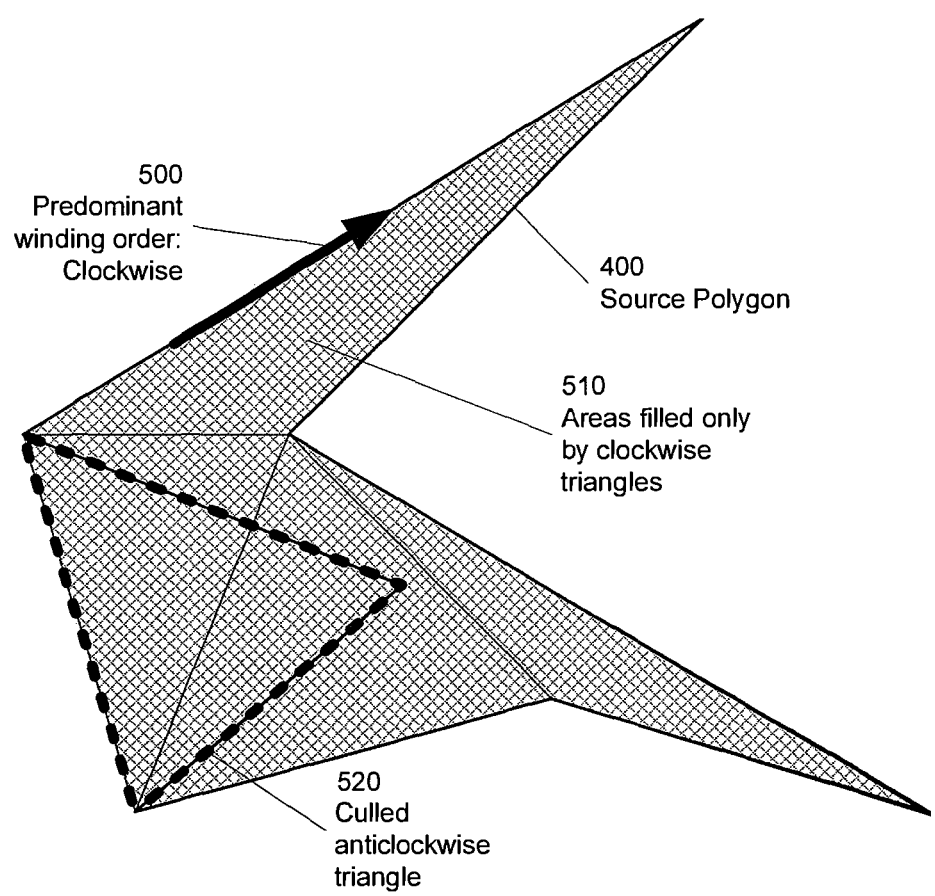
FIG. 16 shows the result of filling the polygon's pixels once the stencil buffer has been determined for a polygon with a consistent winding order, using the triangulation generated to create the stencil but where triangles with the opposite winding order have been eliminated.

The location of the first vertex in FIG. 13 was 'unfortunate'. If the embodiments, instead, received the geometrically equivalent figure shown in FIG. 14 (A), the alternative "Stepsize=1" triangles, 350 in FIG. 14 (B), would instead be produced. This would leave just the region, 370, to be covered by the remaining "stepsize" triangles and lead to no overdraw at all.

Another embodiment thus attempts to reduce the frequency of these pathological cases. Taking inspiration from Seidel's 'true triangulation' method, the alternative embodiment uses a randomisation technique. For each contour, a random or pseudo random offset value can be supplied to or computed by the embodiment. This offset is then added, modulo N, to all the vertex indices in the contour to reduce the likelihood of recurring worst cases.

In some polygon data, the vertices themselves may be supplied as an array of arbitrary indices into a vertex array. It should be obvious one skilled in the art that the embodiments presented here can be extended to support such indirection.

In the Adobe flash format, the edges of arbitrary polygons are apparently supplied in a random, disconnected order. One skilled in the art will realise that a hashing system can be used to reorder these into connected chains before applying the invention described here.

Once the stencil has been set up by drawing the triangulation by the methods above, they can be filled/shaded/textured by any of the known methods known in the art such as those described above, i.e. using the bounding box or re-use of the triangulation. Furthermore, if the winding order of the parent polygon is consistent, the additional enhancement, presented in this invention, may be used whereby the triangulation is resent to the rendering system but instructed to cull triangles with the opposite winding order.

What is claimed is:

1. A method for rendering a computer-generated image, comprising:
   receiving a complex arbitrary polygon comprising multiple overlapping closed polygonal contours;
   dividing each closed polygonal contour into primitives, each primitive being a polygon having at least 3 and at most P vertices where 2<P<N, where N is the number of vertices of the closed polygonal contour;
   concatenating the resulting primitives with primitives resulting from dividing one or more of the other closed contours; and
   rendering the concatenated primitives to produce a computer-generated image.

2. The method according to claim 1, wherein dividing each polygonal contour into primitives comprises:
   (i) storing data representative of a partial contour from the closed polygonal contour;
   (ii) outputting a first level primitive using the stored data, the first level primitive corresponding to contiguous vertices of the closed polygonal contour;
   (iii) updating the stored data;
   (iv) whilst the stored data represents higher level primitives outputting a higher level primitive using the stored data, an (i+I)th higher level primitive corresponding to the end vertices of consecutive ith level primitives, and updating the stored data;
   (v) whilst the stored data represents a further first level primitive outputting the further first level primitive and updating the stored data;
   (vi) repeating steps (i) to (v) until the closed polygonal contour has been divided into primitives or the remaining partial contour has substantially zero area.

3. The method according to claim 2, wherein step (i) comprises storing data to represent at least Q contiguous vertices of the closed polygonal contour where Q is the number of vertices of the first level primitive to be output.

4. The method according to claim 2, wherein updating the stored data in step (iii) comprises overwriting data representative of central vertices of the first level primitive.

5. The method according to claim 2, wherein updating the stored data in step (iv) comprises overwriting data representative of central vertices of the higher level primitive.

6. The method according to claim 1, wherein each vertex is associated with an index and an offset is added modulo N to all the vertex indices in the arbitrary closed polygonal contour prior to dividing the closed polygonal contour into primitives.

7. The method according to claim 1, wherein rendering the primitives further comprises comparing a winding order of each primitive to an overall winding order of the arbitrary closed polygonal contour and using only those primitives whose winding order is the same as the overall winding order in a colour and/or texture filling process.

8. The method according to claim 1, wherein substantially all primitives are triangles.

9. The method according to claim 1, wherein the primitives are not triangles.

10. The method according to claim 1, wherein each separate closed contour has a start and an end point which is not a start/end point of another contour.

11. The method according to claim 1, further comprising selecting a start vertex for the contiguous vertices of the closed polygonal contour, from which to begin the dividing, by applying a randomization technique to indices for vertices of the closed polygonal contour.

12. The method according to claim 1, further comprising separating the complex arbitrary polygon into its constituent closed polygonal contours.

13. Apparatus for rendering a computer-generated image comprising:
an input for receiving a complex arbitrary polygon comprising multiple overlapping closed polygonal contours;
a state machine configured to:
divide each closed polygonal contour, N being a respective number of vertices of each closed polygonal contour, into primitives;
concatenate the resulting primitives with primitives resulting from dividing one or more other closed contour; and
a buffer for rendering the primitives to produce a computer generated image.

14. Apparatus according to claim 13, wherein the state machine is configured to divide each constituent arbitrary closed polygonal contour by:
(i) storing data representative of a partial contour from the closed polygonal contour,
(ii) outputting a first level primitive using the stored data, the first level primitive corresponding to contiguous vertices of the closed polygonal contour,
(iii) updating the stored data,
(iv) whilst the stored data represents higher level primitives outputting a higher level primitive using the stored data, an (i+I)th higher level primitive corresponding to the end vertices of consecutive ith level primitives, and updating the stored data,
(v) whilst the stored data represents a further first level primitive outputting the further first level primitive and updating the stored data, wherein each primitive is a polygon having at least 3 and at most P vertices where 2<P<N,
(vi) repeating (i) to (v) until the closed polygonal contour has been divided into primitives or the remaining partial contour has substantially zero area.

15. Apparatus according to claim 13, wherein each separate closed contour has a start and an end point which is not a start/end point of another contour.

16. Apparatus according to claim 13, further wherein the state machine is configured to divide each closed polygonal contour by determining a starting vertex for primitives determined from a closed polygonal contour by applying a randomization technique to indices of the vertices in the contour.

17. Apparatus for rendering a computer-generated image comprising:
an input for receiving a complex arbitrary polygon comprising multiple overlapping closed polygonal contours;
a vertex stack comprising first and second portions, the first portion containing P stack entries, wherein the vertex stack comprises a read/write path between the first portion and the second portion to allow pushing and popping of stack data between the first and second portions;
a primitive output, coupled to the first portion of the vertex stack;
a state machine coupled to the vertex stack and configured to:
manage the data on the first and second portions of the vertex stack to divide each closed polygonal contour into primitives, each primitive being a polygon having at least 3 and at most P vertices, where 2<P<N, N being a number of vertices of the constituent closed polygonal contour; and
concatenate the resulting primitives of each closed contour; and
a buffer for rendering the primitives to produce a computer-generated image.

18. Apparatus according to claim 17, wherein the state machine is further configured to provide interleaving of primitive levels in primitives outputted from the primitive output by:
(i) storing data representative of a partial contour from the closed polygonal contour,
(ii) outputting a first level primitive using the stored data, the first level primitive corresponding to contiguous vertices of the closed polygonal contour;
(iii) updating the stored data,
(iv) while the stored data represents higher level primitives outputting a higher level primitive using the stored data, an (i+I)th higher level primitive corresponding to the end vertices of consecutive ith level primitives, and updating the stored data,
(v) when the stored data represents a further first level primitive outputting the further first level primitive and updating the stored data, and
repeating steps (i) to (v) until the closed polygonal contour has been divided into primitives or the remaining partial contour has substantially zero area.

19. Apparatus according to claim 18, wherein each separate closed contour has a start and an end point which is not a start/end point of another contour.

* * * * *

UNITED STATES PATENT AND TRADEMARK OFFICE
CERTIFICATE OF CORRECTION

PATENT NO. : 11,232,634 B2
APPLICATION NO. : 16/934206
DATED : January 25, 2022
INVENTOR(S) : Fenney Page 1 of 1

It is certified that error appears in the above-identified patent and that said Letters Patent is hereby corrected as shown below:

On the Title Page

Please add:
(30) Foreign Application Priority Data
May 18, 2009 (GB) .............................. 0908506.9
Mar. 24, 2010 (GB) .............................. 1004977.3

Signed and Sealed this
Twenty-sixth Day of April, 2022

Katherine Kelly Vidal
*Director of the United States Patent and Trademark Office*